Nov. 22, 1966

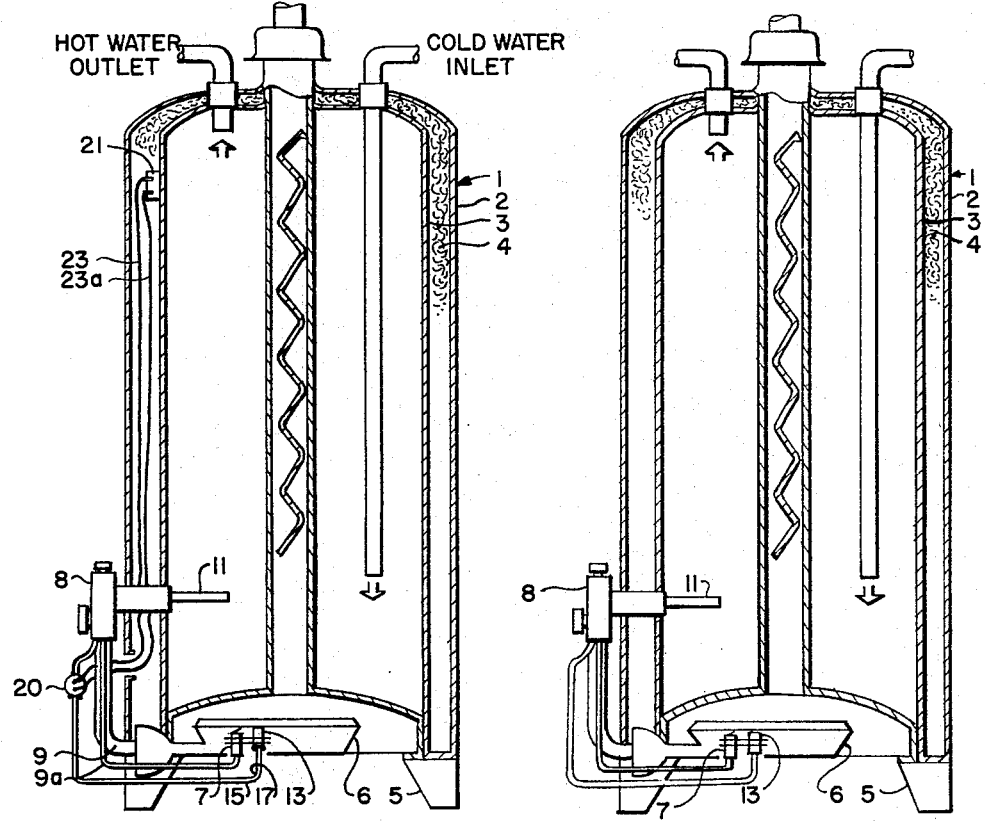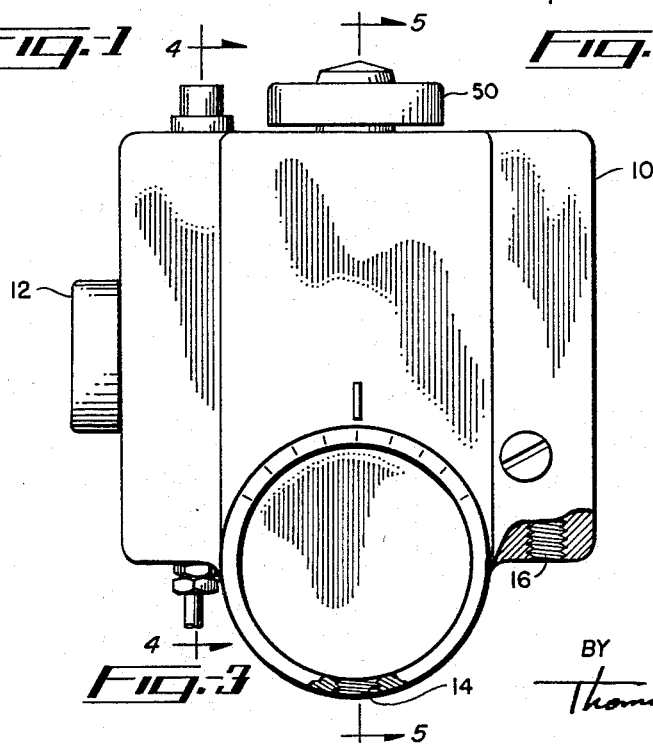

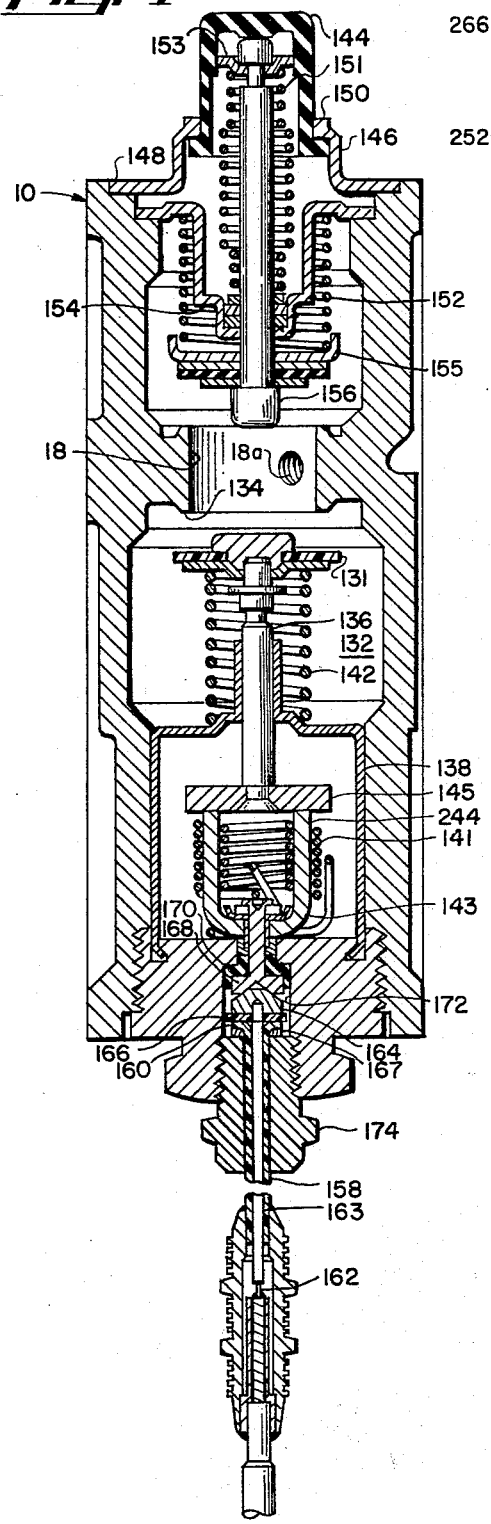

W. F. JACKSON ETAL  3,286,923

THERMOSTATIC CONTROL DEVICE FOR NORMAL AND ABNORMAL CONDITIONS

Filed June 11, 1963  7 Sheets-Sheet 3

INVENTORS
WILBUR F. JACKSON
HENRY C. BRAUCKSIEK

BY

*Thomas L. Kuban*

ATTORNEY

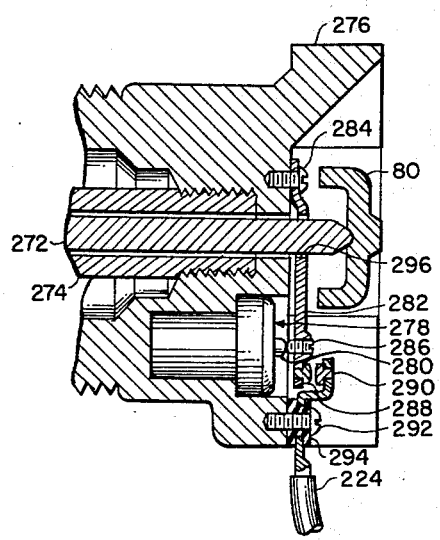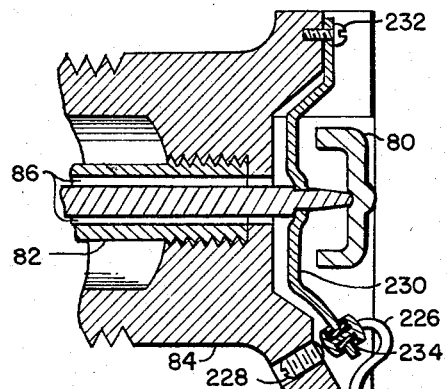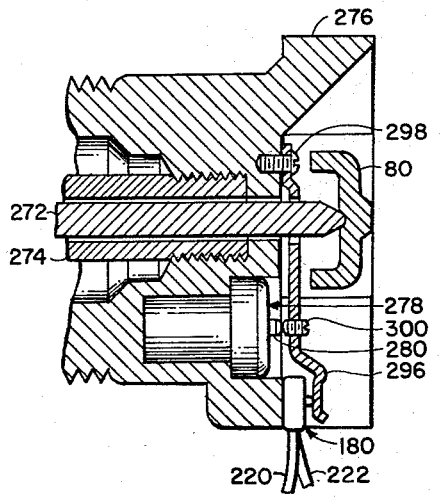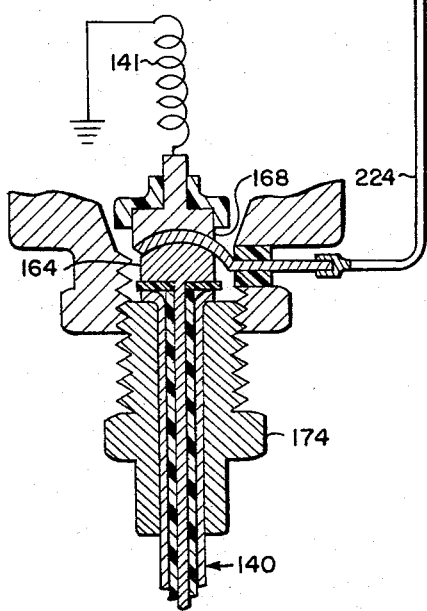

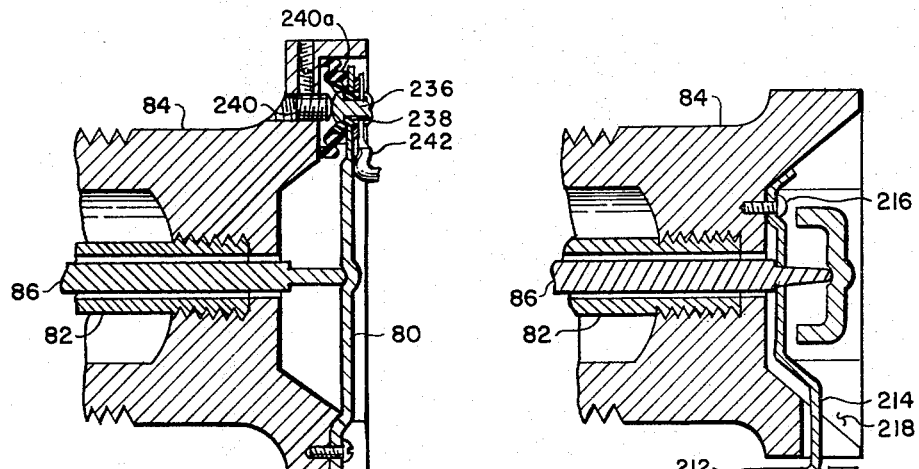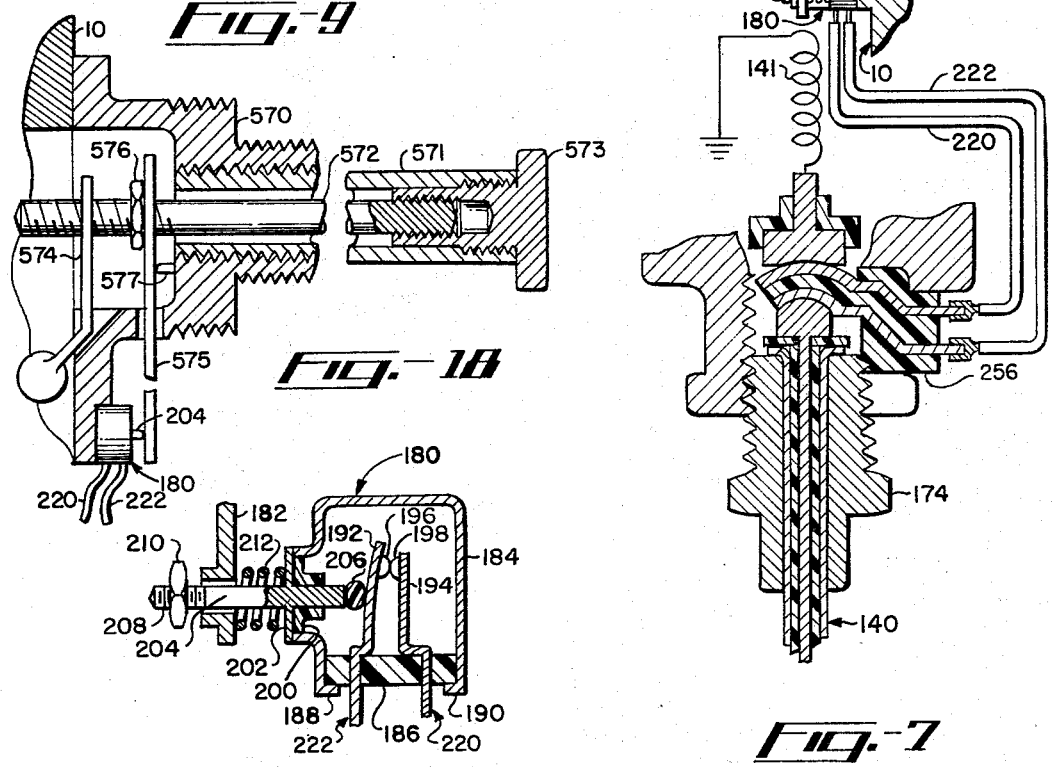

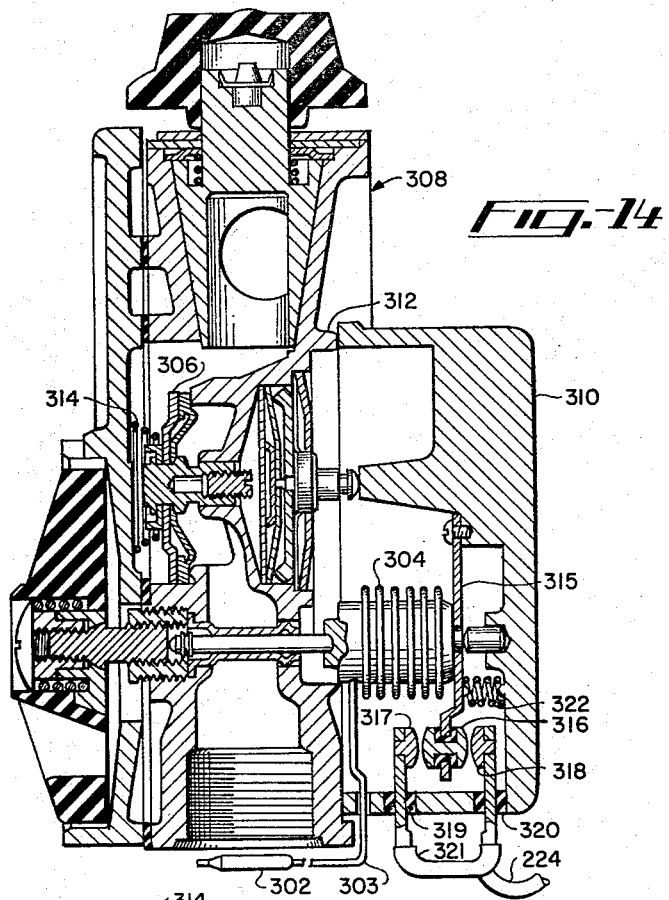
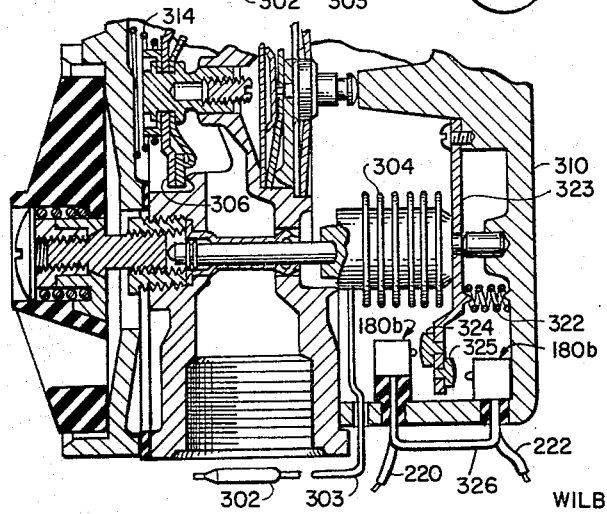

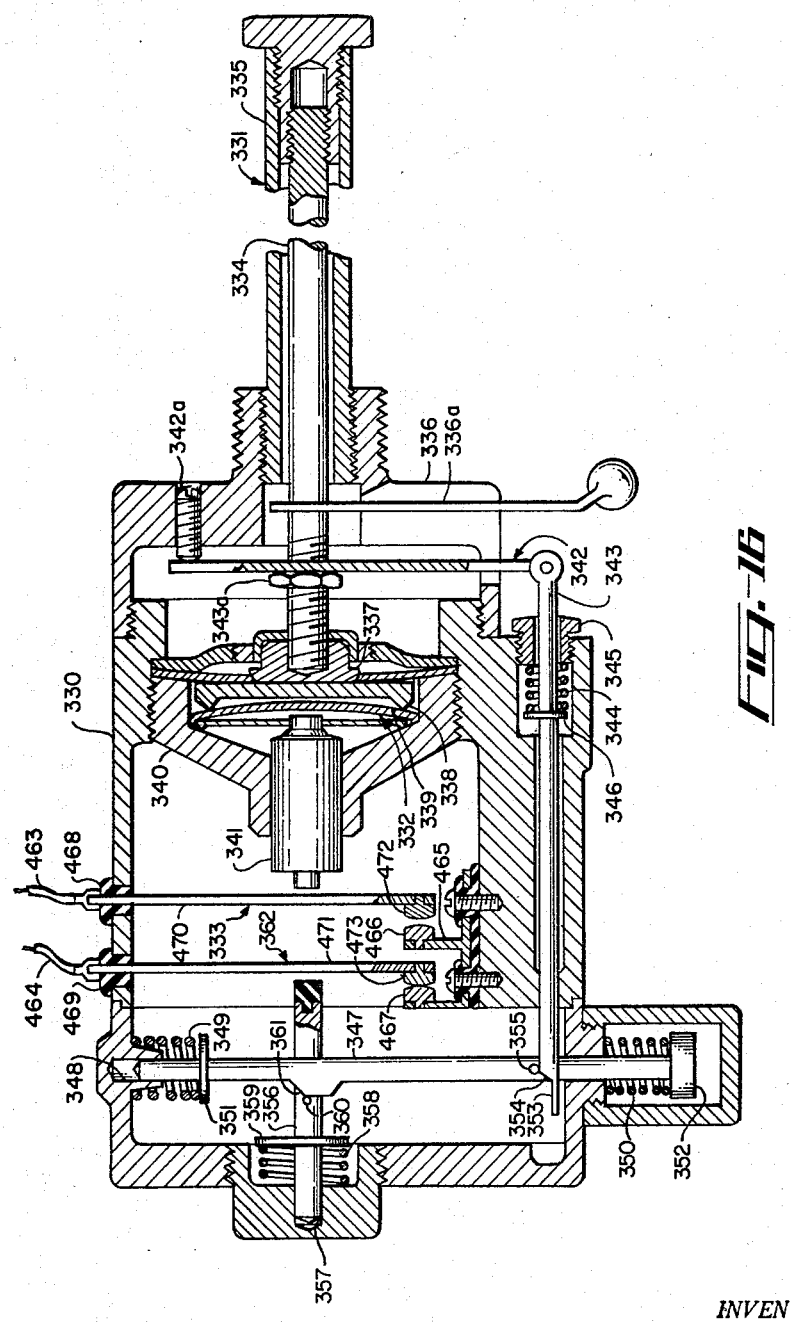

United States Patent Office 3,286,923
Patented Nov. 22, 1966

3,286,923
THERMOSTATIC CONTROL DEVICE FOR NORMAL AND ABNORMAL CONDITIONS
Wilbur F. Jackson, Rolling Hills, and Henry C. Braucksiek, Buena Park, Calif., assignors to Robertshaw Controls Company, Richmond, Va., a corporation of Delaware
Filed June 11, 1963, Ser. No. 287,061
13 Claims. (Cl. 236—21)

This invention relates to a high temperature control and more particularly to a control for preventing unsafe temperature conditions from being developed within an appliance heated by a gaseous fuel or by electricity.

Currently, it is quite conventional to use a temperature control device in a hot water heater placed in the lower portion of a hot water tank to sense the temperature at the lower portion of the tank and to intermittently add heat at the bottom of the tank. In order to prevent extreme temperatures from developing at the upper portion of the same hot water tank, it is quite normal and conventional to place a thermally responsive high limit switch separate and distinct from the control element at the lower portion of the tank. Actuation of the switch would automatically shut off the entire system. This thermally responsive switch is placed adjacent the exterior surface of the inner tank of a hot water heater and is attached thereto by some bracket or other mounting devices which are fixedly attached to the tank. Surrounding the inner tank of the hot water heater is a blanket of insulation material and an outer shell covers this insulation to form the assembled tank. Thus it is quite apparent that the high limit switch is normally mounted on the inner tank before the assembly of the insulation blanket and the outer shell.

On most controls for hot water heaters, it is also conventional to use an automatic pilot shutoff valve which will operate in the event the pilot gas flame is extinguished, either accidentally or purposely, and will shut off all gas flow to the hot water heater. As is customary in the trade, the automatic shutoff includes a thermocouple placed in the flame of the pilot gas which will generate a current upon sustained heating of a hot junction. This current energizes an electromagnet which holds an armature and a valve in the open position during constant current generation at the thermocouple. The thermally responsive switch discussed above is placed in series with the thermocouple circuit and has two electrical wires leading from the switch in series with the thermocouple leads and the electromagnet leads. The thermally responsive switch normally uses a bimetallic element which will be set thermally to operate or to open the switch on upper limit temperature, for instance, in the range of 190° Fahrenheit or more.

It should be apparent that the electrical wires or leads must also be threaded or fished from the thermostat control at the lower portion of the hot water heater to the thermally responsive switch placed at the upper portion of the heater. The manipulation of the electrical leads causes a great amount of difficulty and takes time for such assembly. The number of parts of this entire assembly is not to be discounted since the cost and time involved are both quite high.

In the event the thermally responsive switch becomes inactivated in service, or the electrical leads between this switch and the control mounted in the lower portion of the hot water tank burn out, the maintenance becomes extremely expensive and time consuming. The repair of this unit requires the removal of the top and/or the outer jacket of the hot water tank with some disturbance of the insulation blanket around the inner tank. It should be apparent that the maintenance of this switch can be an extremely expensive proposition which has a marked effect upon the attractiveness of this feature within the hot water heater industry.

It is a great rarity for controls used to regulate the amount of a gaseous fuel directed to a burner to malfunction such that the control valve does not fully close, or the temperature sensor fails during operation. It is possible that dirt, foreign matter, metal shavings or the like may be found in the gas conduits leading to the control and may eventually be lodged upon the valve or valve seat which controls the amount of gaseous fuel passing through the control. Under this condition, a very deleterious effect would occur since the gaseous fuel could reach the burner regardless of the temperature sensor position.

In accordance with the present invention, a primary object provides a control having additional safeguards against overheating in case of failure of conventional safety devices.

In accordance with the present invention, the possibility of malfunction of the control has been reduced by placing an additional safety device adjacent the control element. It may be appreciated that the great percentage of controls operate safely, however, a single accident could have a devastating effect upon the control, the appliance which it regulates, and the surrounding household or structure in which the control and the appliance are housed. The advantage of the present invention should be apparent by using such an additional safety device.

In accordance with the present invention, we have eliminated the undesired features of a thermally responsive high limit switch mounted on the upper portion of a hot water heater. One feature of this invention is to incorporate a high limit switch which is operated directly by a thermostatic control which may be integrally assembled and positioned in the lower portion of a hot water heater tank. This high limit switch may be operable at a temperature setting which is different from that used for operating a thermostatic control and for convenience sake should be of a temperature setting above that of a normal thermostatic control.

A related feature of this invention is the provision of single thermal responsive actuating means which will operate the thermostatic valve in a control and also operate a high limit switch. This arrangement affords the elimination of a thermal responsive element normally used on such a switch while its function is still retained.

According to a preferred feature of this invention, means for interrupting electrical flow may be affected by movement of a thermal responsive actuating element used on a thermostatic control device. The interrupting means when actuated by the thermal responsive actuating means would thereby operate as an automatic pilot gas shutoff.

The present invention is not necessarily limited to any particular gas or electrically heated appliance and includes heated vessels such as hot water heaters, room space heaters, forced air furnaces and other heating devices which use controls that are operated by thermal responsive actuating elements and that include a high temperature cutoff switch used for safety measures in preventing extreme temperatures from developing within the area or vessel to be heated.

Other features and advantages of this invention will become apparent from the following detailed description and the accompanying drawings of which:

FIGURE 1 is a schematic drawing of a hot water heater in vertical cross-section and using a conventional high temperature limit switch located on the uppermost portion of the tank;

FIGURE 2 is a schematic drawing of a water heater shown in vertical cross-section and embodying the present invention which does not require a high limit switch located at the upper portion of the hot water heater;

FIGURE 3 is a front elevation of a thermostatic control constructed in accordance with the present invention;

FIGURE 4 is a longitudinal cross-section taken along line 4—4 of FIGURE 3 illustrating on an enlarged scale a reset means and an electromagnet which allows the main gas to flow through the control under normal operating conditions;

FIGURE 6 is a partial longitudinal cross-section of a thermal responsive actuating device used in combination with another embodiment of the present invention;

FIGURE 7 is still another embodiment of the present invention showing a thermal responsive actuating means partially in cross-section;

FIGURE 8 is a partial cross-sectional view of the switch used in combination of FIGURES 5 and 7;

FIGURE 9 is yet another embodiment of the present invention shown in combination with a thermal responsive actuating element shown in partial section;

FIGURE 10 is a partial cross-section of an electrical junction shown in partial cross-sectional view and assembled between the electromagnet terminal and the thermocouple connection;

FIGURE 11 is an exploded perspective view illustrating the electrical terminal used in combination with a portion of the electromagnet element and the thermocouple assembly;

FIGURE 12 is a partial longitudinal cross-sectional view of another embodiment of the present invention wherein two separate temperature sensors are used, and is somewhat similar to the arrangement shown in FIGURE 6;

FIGURE 13 is a partial longitudinal cross-section of another embodiment of the present invention having two separate thermal sensors and is somewhat similar to the embodiment illustrated in FIGURE 7;

FIGURE 14 is a longitudinal cross-section through a gas valve wherein the temperature sensor is a bulb and bellows;

FIGURE 15 is a partial longitudinal cross-section of another embodiment of the present invention wherein the temperature sensor is a thermal element operating a pair of switches;

FIGURE 16 is a longitudinal cross-section of an electric switch operated by a temperature sensor and embodying the present invention;

FIGURE 18 is yet another embodiment of the present invention illustrating a partial cross-sectional view of the present invention as applied to another embodiment of the present invention.

Figure 5:
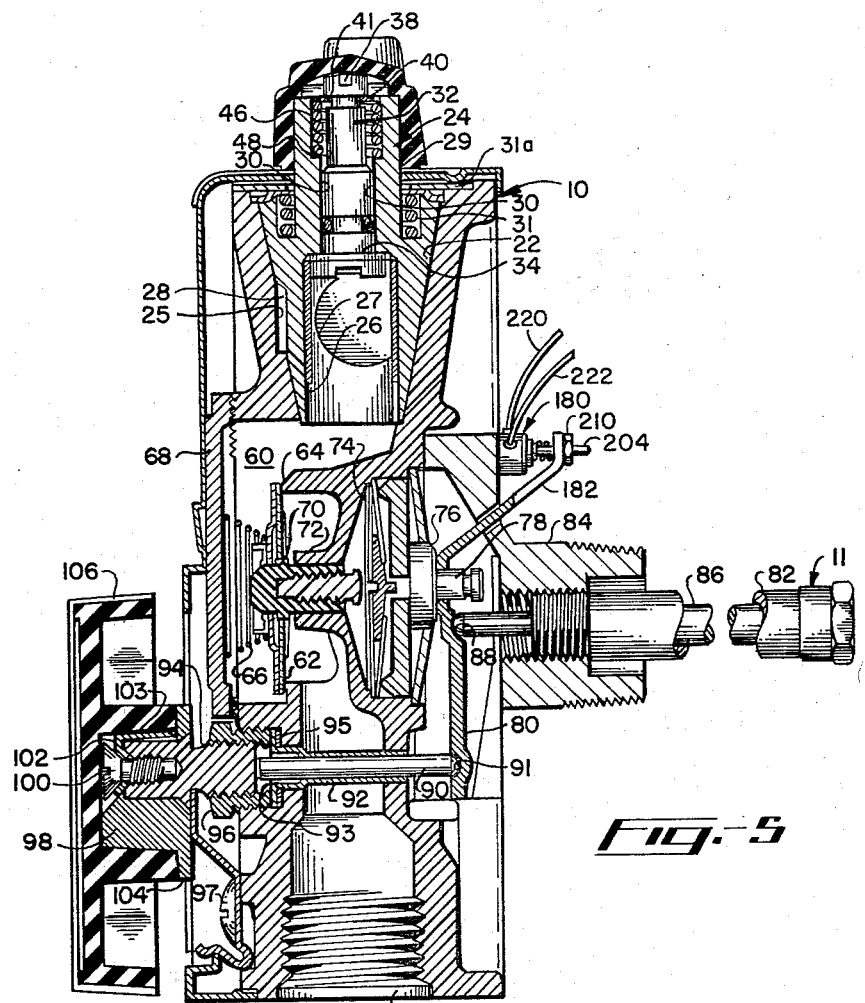
FIGURE 5 is a longitudinal cross-section taken along line 5—5 of FIGURE 3 illustrating on an enlarged scale a thermal responsive actuating means and a control constructed in accordance with the present invention in which the thermal responsive means can operate a thermostatic valve and a high temperature limit switch.

Before explaining the invention in detail, it is to be understood that the invention is not limited in its application to the details of construction and arrangement of parts illustrated in the accompanying drawings, since the invention is capable of other embodiments and of being carried out in various ways. Also it is to be understood that the phraseology or terminology employed herein is for the purpose of description and not of limitation.

Referring now to FIGURE 1, the water heater 1 comprises an outer casing 2 and an inner cylindrical wall 3. Insulation material 4 is inserted between the casing 2 and inner wall 3 with the entire structure mounted on a base 5. A burner 6 is mounted with the base 5 and is disposed in the lower portion of the inner wall 3. In the present embodiment, the gas burner 6 is of a conventional type in which the gas supply induces primary air into a venturi with the gas-air mixture passing into a plenum from which the mixture is emitted through suitable openings mixed with secondary air that is burned. Positioned adjacent to the burner 6 is a pilot burner 7. Both the pilot and the gas burners are operatively associated with a control 8 by the means of gas lines 9 and 9a and protruding within the inner wall 3 is a thermostatic sensing element 11 which operates valve means controlling the gas flowing through the control 8 to the main burner 6 in response to this sensed temperature. The control 8 also has an automatic shut-off system which in part uses a thermocouple 13 mounted adjacent to the pilot burner 7 and having two electrical leads 15, 17, leading back to a junction box 20 that is connected to an electromagnet (not shown) mounted within control 8. A high limit switch 21 is mounted on the upper portion of the inner wall 3 and is of a conventional construction similar to that illustrated in the United States patent to Stanley et al., 2,781,977. A pair of electrical wires 23, 23a are attached to the switch 21, which are ducted between the casing 2 and inner wall 3 along the entire length of the hot water heater and which extend through the outer casing 2 and are attached to the junction box 20.

Referring now to FIGURE 2, a similar arrangement for the hot water heater 1 having an outer casing 2 and inner wall 3 with insulation 4 therebetween is used with a similar burner 6, thermocouple 13, pilot burner 7, and control 8 arrangement as illustrated in FIGURE 1. In this device, is illustrated the advantages of the present invention since the high limit switch function is retained while the switch need not be positioned at the upper portion of the inner wall 3 of the tank nor are electrical wires required to connect it electrically with the control device; nor is a separate temperature sensing element required to operate this switch. By comparing FIGURE 2 with FIGURE 1, it is readily apparent the advantages of using the present invention in the water heater.

Referring now to FIGURES 3, 4 and 5, the control device comprised of the casing 10 is provided with an inlet 12 and outlet 14 for supplying fuel to a main burner and an outlet 16 for supplying fuel to the pilot burner. A main fuel passage 18 through the casing 10 provides communication between the inlet 12 and the outlet 14. A pilot passage (not shown) provides communication between the pilot outlet 16 and the valve chamber, later to be described. As is customary in such devices, a suitable piping or tubing connection is provided at the inlet 12 and outlets 14, 16.

A conical bore 22 is provided in the upper part of the casing 10 and is positioned so as to have the main fuel passage 18 opening into the side thereof, and continuing out the bottom thereof.

A plug valve 24 of generally conical configuration and having a cylindrical bore 26 in the lower portion thereof, is seated in the conical bore 22 for rotary movement therein. A circular opening 27 is provided in the wall of the plug valve 24 and is adapted to allow communication between the passage 18 and the interior of the plug valve 24. A recess 28 is positioned down the opposite side of the plug valve 24 and communicates with the recess 25 in the bore 22 to allow communication between the passage 18 and the pilot passage (not shown).

When the plug valve 24 is turned to align the opening 27 with the passageway 18, fuel will flow through the opening 27 into the cylindrical bore 26 of the plug valve 24 and out the open bottom thereof toward the outlet 14. The recess 25 is so positioned in relation to the recess 28 that communication is established between the passage 18 and the pilot passage (not shown) when the opening 27 faces the passage 18. Thus fuel will flow around the periphery of the valve 24 in the recesses 25 and 28 and into the pilot passage.

If the plug valve 24 is turned clockwise until the opening 27 faces the wall of the conical bore 22, flow of fuel will be prevented through the passage 18 to the outlet 14. However, the recess 28 is of sufficient size to still allow flow of fuel into the pilot passage. Further rotation of the plug valve 24 moves the recess 28 to a fuel flow preventing position, thus preventing flow to both outlets 14 and 16. Thus the plug valve 24 provides a supply of fuel to the main burner and pilot burner when in the ON position, permits the supply of fuel only to the pilot burner when in a pilot controlling position, and prevents supply of fuel to both the pilot and main burners when in an OFF position.

A cylindrical end portion 29 of the plug valve 24 projects exteriorly in the casing 10 and has a cylindrical bore 30 of a smaller diameter than the bore 26 and axially aligned therewith. A spring 31 encircles the end portion 29 and is mounted in compression between the bottom wall of a recess formed in the valve 24 and washer 31a. An adjusting shaft 32, axially aligned with the bore 26 extends through the bore 30 and has a flanged end portion 34 engaging the upper end of the bore 26. The other end 36 of the adjusting shaft 32 extends slightly past the end portion 29 and is provided with a slot 38 which enables the adjusting shaft 32 to be manually rotated. A washer 40 is located below the slotted end 38 and is retained by clip 41 seated on an annular groove and biased toward the end 38 by a spring 46, positioned between the washer 40 and a shoulder 48 formed in the bore 30. The washer 40 has a downwardly extending spring portion (not shown) which engages the end portion 29 to create a biasing force for retaining a manually operable knob 50 on the projecting end portion 29 of the plug valve 24.

A valve chamber 60 is positioned in the main fuel passage 18 between the outlet 14 and the plug valve 24. A control element or thermostatically controlled valve 62 which may be of any suitable form is positioned in the valve chamber 60 and cooperable with the valve seat 64 to control the flow of fuel through the valve chamber 60. The valve 62 is biased toward the valve seat 64 by a spring 66 which is mounted in compression between the valve 62 and a plate 68. A valve stem 70 is suitably connected to the valve 62 and projects through a bushing 72 formed in a wall of the casing 10 to extend into engagement with a snap acting mechanism 74 of a type well known in the art. An operating button 76 of the snap acting mechanism 74 abuts a suitable projection 78 formed in the extremity of operating lever 80. The other end of the operating lever engages the end of the operating shaft 90.

Thermal responsive actuating means is provided for operating the snap action mechanism 74 and includes a thermal element of the rod and tube type with a tube 82 of expandable material secured to the casing 10 by a shank 84 and a rod 86 of relatively non-expandable material extending into the casing 10 and being free to move relative thereto. The free end of the rod 86 is in engagement with the recess 88 formed in the operating lever 80 in the central portion thereof.

Operating shaft 90 engages a recess 91 at the lower end of the operating lever 80 which provides a pivoting point therefor. A sleeve 92 extends across the passage 18 adjacent the outlet 14 and has one end thereof press-fitted and sealed within a hole in the casing 10, the other end thereof having a flanged portion 93 abutting a gasket 95 to provide effective sealing. Thus the hollow interior of the sleeve 92 is sealed from the passage 18. The operating shaft 90 extends from the recess 91 through the sleeve 92 and has an opposite end thereof engaging an adjusting screw 94 which is threaded into a wall of the bushing 96.

The bushing 96 is also threaded within the casing 10 and holds the flanged portion 93 in engagement with the gasket 95. The adjusting screw 94 has an end thereof projecting from the casing 10, to which a stop 98 and a washer 102 having an extending spring portion 103 is attached by a screw 100 threaded within the adjusting screw 94.

A flange 104 is fixed to the other end of the stop 98 and is adapted to seat a manual operable knob 106 which is slidably received on the stop 98 and biased to a rigid position therein by the spring portion 103.

It will be apparent to those skilled in the art that rotation of the adjusting screw 94 by the knob 106 relative to the casing 10 will affect axial movement thereof to adjust the pivoting point of the lever 80 through a range of positions; thus a temperature at which the rod and tube thermal element 82, 86 will cause actuation of the snap action mechanism 74 and the valve 62 will be determined by the position of the lever 80. Since temperature setting and actuating mechanisms for thermostatically controlled valves of the type herein disclosed are well known in the art, further description is deemed unnecessary.

As is customary in such devices, a safety means is provided which will shut off the flow of fuel of both the main and pilot burners in the event of failure of flame at the pilot burner. To this end, a safety valve 131 is positioned in a chamber 132 which is in communication with the inlet 12, passage 18 and pilot gas port 18a. The valve 131 cooperates with a valve seat 134 to control the flow of fuel to the plug valve 24. The valve stem 136 has one end operatively attached to the valve 131 and the other end extending into the housing 138 and operatively connected to a thermal electric safety means contained therein. This thermal electric safety means comprises a thermocouple 140 (FIG. 11) located in proximity of the flame at the pilot burner and having its ends providing a series connection to a winding 141 on the frame 143 of the electromagnet. An armature 145 is engageable with the pole faces of the magnet frame 143 when in its attracted position and is in spaced relation therefrom in the released position. It will be understood that the current generated by the thermocouple 140 when heated by the flame of the pilot burner is insufficient to attract the armature 145 into engagement with the pole faces of the magnet frame 143 but is sufficient to maintain such relation when the armature 145 has been placed in an attracted position. Since the valve 131 is operatively connected to the armature 145, it will be held in its open position when the armature is held into engagement with the pole faces of the magnet. A spring 142 is mounted in compression between the housing 138 and the valve 131 and thus serves to bias the valve 131 toward the closed position whereby the armature 145 is biased toward a released position. Thermoelectric safety devices of the described type are well known in the art.

Manually operable means are provided for resetting the armature from its released to its attracted position and thus the valve 131 from its closed to an open position. This means comprises a resetting button 144 slidably mounted in a guide 146 formed in the cover plate 148. An enlarged portion of the button 144 cooperates with the flange 150 formed on the end of the guide 146 to prevent ejection of the button 144 from the guide 146 by the spring 151 which is mounted in compression between a washer 153 and the lower end of the cup 154 secured to the casing 10. A coil spring 152 encircles the guide cup 154 and is mounted in compression between the upper end of the guide cup 154 and a retaining washer 155 that is fixed to the lower end of a stem 156. The upper end of stem 156 is fixed to the washer 153 for movement by the button 144 and the lower end of stem 156 protrudes through the cup 154 toward the valve 131 and is axially aligned therewith. It can be seen that movement of the button 144 toward the housing 138 will cause movement of the valve 131 to an open position thus causing the armature to move to its attracted position.

As shown in FIGURES 4 and 11, thermocouple 140 is of standard construction formed in part as a tubing 158, terminating in a flanged portion 160. Lead 162 has an insulation material 163 formed around its periphery to prevent shorting with the tubing 158, and is contained therein. Lead 162 terminates in a head portion 164 which is fixedly attached thereto, an insulating washer 166 is interposed between the head portion 164 and the flange portion 160, and a lock washer 167 placed under flange portion 160. Head portion 164 is in abutting relation with seat 168 which is fixedly connected with winding 141. Insulation material 170 is placed within the bore 172 to prevent shorting of the seat 168 on the surrounding metallic material. An adapter 174 encircling tubing 158 is used for threadedly engaging the entire thermocouple assembly against the seat 168.

A movable thermal responsive actuator means is attached to the rear of the casing 10 and in the embodiment illustrated in FIGURE 5, a rod 86 and tube 82 arrangement is used. A conventional bulb and bellows sensor may be used as the actuator means and still be within the confines of the present invention.

One embodiment of the present invention is illustrated in FIGURE 5, wherein a means for electrically interrupting electrical energy flow through a conductor is operatively associated with the rod 86 and tube 82 arrangement. One form of the electrical interrupting means is a switch 180 mounted on the rear of the casing 10 and operated by lever 182 formed integrally with lever 80. Switch 180 may alternately be mounted within the casing 10 for appearance purposes.

The switch 180 shown in detail in FIGURE 8, is exemplary only of one form of a multitude of types of switches which may be incorporated in the present invention. This switch is of the normally open variety, however, in the normal operating range of the hot water heater, it assumes the closed position.

The switch 180 illustrated in FIGURE 8 is one form of the switch which may be used for the present invention and comprises: a housing 184 having a base 186 held therein by a pair of flanges 188, 190 and a pair of contact arms 192, 194 mounted within the base. A conventional type of contacts 196, 198 are on the contact arms 192, 194 and positioned adjacent each other. A guide 200 forms a closure seal for one end of the switch casing 184 and has a central aperture through which an operating rod 204 passes; a collar 202 is integrally formed on the arm 204 intermediate its ends for movement therewith. The arm 204 has an electrically insulated contact head 206 at one end and a threaded portion 208 at the opposite end for holding the nut 210 thereon. Lever 182 is apertured to receive on the arm 204 and is held in position by a spring 212 acting between the lever 182 and the collar 202; the spring 212 provides for override of lever 182 upon switch closure.

Another embodiment of the present invention is illustrated in FIGURE 7, wherein the switch 180 is mounted upon the casing 10 and a separate spring arm 214 has one end fixedly attached to the shank 84 by the screw 216. This spring arm 214 extends through an opening 218 in the shank 84 and is mounted on the switch arm 204 in much the same manner as lever 182 is mounted on switch 180, as illustrated in FIGURE 8. Although two examples of operating the normally open switches are shown in FIGURES 5 and 7, it will be noted that there may be any number of operating levers which are used to transmit the movement from the rod-tube arrangement to the switch. Leads 220 and 222 are connected to the contact arms within switch 180 and connected in series with the thermocouple 140.

The electrical interrupting means used in FIGURES 5 and 7 are held in a closed position through the spring action of the operating levers and position of rod 86. As shown in FIGURES 5 and 7, the switches 180 are shown under normal operating temperatures of the hot water heater. Under an abnormal temperature condition, the rod 86 will move in response to expansion of tube 82 to cause the lever extension to release the loading force on the normally open switch and open the circuit. Through the rotation of the adjusting nut 210, the switch may be calibrated for a specific temperature at which the switch will open in the event the temperature within the hot water heater reaches an extreme value.

In FIGURE 6, is illustrated another embodiment of an electrical interrupting means in which a single wire lead 224 is connected to a contact 226 normally in spaced relation with an electrical grounding screw 228 threaded within the shank 84. Spring lever 230 has one end fixedly mounted upon the shank 84 by screw 232 and extends around the rod 86 to the opposite side of the shank 84. Contact 226 is mounted on arm 230 with an insulation button 234 surrounding it to prevent accidental grounding of the circuit. Ground screw 228 is threaded within the shank 84 and is positioned coaxially with the contact 226. Insulated electrical wire 224 is attached to contact 226 and extends to the thermocouple 140 circuit. Adjustment of the screw 228 can change the temperature at which the electrical shorting will occur and in this way, the desired temperature above the setting of the thermostat control can be regulated.

Referring now to FIGURE 9, another embodiment of the present invention is illustrated in which the lever 80 has an extension thereon with a grounding contact 236 mounted in its upper portion. An insulation collar 238 is mounted around the contact 236 to prevent accidental grounding of the device. A grounding screw 240 is threaded into the shank 84 and is adjacent the contact 236 such that movement of the lever will bring the contact and the grounding screw 240 into engagement. Boot 240a protects the contact 236 from contaminants. As in the embodiment illustrated in FIGURE 6, the contact has an electrical lead 242 attached thereto which is connected in series with the thermocouple circuit (not shown).

Another feature of the present invention includes an electrical terminal 250 (as shown in FIGURE 10) which may be inserted between the thermocouple head portion 164 and the seat 168. Formerly a junction box of some sort, such as the box 20 shown in FIGURE 1, was used to connect the thermocouple and the high limit switch in series.

Referring now to the FIGURES 10 and 11, an electrical terminal 250 includes the insulated electrical conductors or leads 220, 222, attached to opposite sides of the switch 180 as schematically illustrated in FIGURES 6 and 7. A slot 252 is cut centrally through the threaded plug 254 and this slot receives the molded terminal body 256. Terminal body 256 has lands 258, 260, thereon which are slightly smaller in width than the plug slot 252 and also has a cylindrical head portion 262 which is slightly smaller in diameter than the threaded bore 264 within the plug 254 which facilitate assembly of the entire device.

The leads 220, 222, positioned within the terminal body are deformed in part at their extremities 266, 268 respectively and in the preferred embodiment, the extremity of the conductors have a conical shape which mate with the head portion 164 and seat 168, thus aiding good electrical contact. A strip of insulating material 270 is placed between the deformed extremities to prevent accidental shorting of the lead wires 220, 222.

Preferably the terminal body 256 is made from a molded material such that the body might completely surround the insulated leads 220, 222, contained within it. By surrounding the periphery of the deformed portions of the terminal leads, the cylindrically formed portion 262 is used to protect the ends of the leads 220, 222, and to prevent accidental grounding of the leads against adjacent components. The terminal body 256 leaves a portion of each deformed extremity 266, 268 uncovered so that the head portion 164 and the seat 168 may contact the deformed portion of the leads 220, 222.

To place the control device in operative condition, and referring to FIGURES 1–11, the dial 50 is rotated to the pilot position wherein the recess 28 establishes communication between the main fuel passage 18 and the pilot passage (not shown). In such position of the valve 24, fuel will be permitted to flow around the valve 24 by the recess 28 and out the outlet 16 to the pilot burner.

The button 144 is manually depressed to cause engagement of the armature 145 with the pole faces of the magnet 244 and movement of the valve 131 away from the seat 134 to allow flow of fuel from the inlet 12 to the plug valve 24 and by the above described path to the pilot burner where it may be ignited by a match or the like.

Flame at the pilot burner will heat the hot junction of the thermocouple 140 to cause the same to develop sufficient current to energize the winding 141 of the electromagnet. The reset button 144 is now released but the armature 145 remains in its attracted position and thus the valve 131 is in its open position.

The plug valve 24 may now be rotated by the dial 50 to the ON position wherein the opening 27 is aligned with the passage 18 to allow flow of fuel through the plug valve 24 to the thermostatic valve. Upon demand for heat, the rod 86 exerts a force on the lever 80 which causes the lever 80 to pivot on the end of the operating shaft 90 and causes movement of button 76 to the snap mechanism 74. This movement opens the valve 62 against the bias of the spring 66 allowing fuel to flow to the main burner.

When temperature sensed by the sensor element 82, 86 is that for which the adjustment has been set, closure of the valve member occurs under the bias of the spring 66 and is permitted due to reverse positioning of the snap action mechanism 74 as is well known to those skilled in the art. During this normal reciprocation of the valve 62, in allowing fuel to the outlet 14, the valve 131 remains in its open position. The temperature at which the snap mechanism 74 will operate to open or close the valve 62 may be varied by rotating the dial 106 to change the pivoting point of the lever 80.

Should the flame at the pilot burner become extinguished, the safety valve 131 will close and the supply of fuel to the plug valve 24 will be shut off. To conduct the resetting operation, it will be necessary to first rotate the dial 50 until the plug valve 24 is in the pilot position, in which the resetting operation may be effected as above described.

Under normal operating conditions of the water heater, FIGURES 2, 5, and 8, the switch 180 is biased closed and the valve 62 will be opened and closed in accordance with temperature sensed by the rod 86 and tube 82 arrangement. Under abnormal conditions, the temperature of the water in the hot water heater sensed by the rod and tube is higher than that recommended for safe operation. In this abnormal condition, the tube 82 will expand to thereby cause the lever 80 and 182 to rotate clockwise around its pivot point at pivot point 91 on the shaft 90. This movement will continue until the lever 182 moves the nut 210 lifting the arm 204 from the contact arm 192 and allowing the normally open switch tio break the contacts 196 and 198. It should be noted that the contact arms 192, 194 are electrically connected in series (similar to that shown in FIGURE 7) with the thermocouple 140 such that opening switch 180 will break the electrical connection between the thermocouple 140 and the electromagnet, FIGURE 4, thereby allowing the armature 145 to be forced away from the electromagnet frame 143 and allow the valve 131 to close. This operation would then close the main flow of gas through the housing and thereby prevent the water heater from further heating.

Referring now to the operation of the embodiment shown in FIGURES 6 and 9, as the temperature within the hot water heater approaches an abnormal temperature during a malfunction, the tube will expand causing the rod to follow it and thereby first close the valve 62 (FIGURE 5) and continued movement of lever 80 will force contact 226 and contact 236 to engage their respective ground screws 228 and 240. This action grounds the current flowing through the thermocouple 140 and allows the armature 145 (FIGURE 4) to release, causing the valve 131 to close, shutting off all gas flow through the entire control.

Another embodiment of the present invention is illustrated in FIGURE 12 and has some similarity to the embodiment illustrated in FIGURE 6. The illustrated embodiment would naturally be mounted upon the control 8, see FIGURE 5, in place of the shank 84 and sensing element 11. A rod 272 and tube 274 arrangement is mounted within the shank 276 and a second temperature sensing and operating means such as a cylinder member or thermostatic sensing element 278 is used as a second means for sensing temperature variations. The particular thermostatic device is of the variety described in the U.S. patent to Branson 2,917,925 and assigned to the same assignee as the subject application. The device is filled with a temperature sensing medium such as wax or the like whereby an increase in temperature sensed by the device causes the wax to expand and move a cylinder contained within the device to force a shaft 280 extending exteriorly of the device outwardly in proportion to the variations in temperature. An arm 282 is fixedly attached at one end by a screw 284 to the shank 276 and has its opposite end mounted with an adjustable screw 286 therein which is in engagement with the shaft 280 extending from the thermostatic sensing element 278. By rotating the screw 286, it is possible to adjust the temperature at which the device will operate. A contact 288 is mounted on the extremity of the arm 282 and is in juxtaposition and in spaced relation with a contact 290 mounted on the insulated lead 224. Lead 224 is fixedly attached to the shank 276 by the screw 292 passing through an insulated bushing 294. The rod 272 passes through perforation 96 in arm 8 and is in spaced relation thereto which makes the arm 282 insensitive to movement of the rod 272.

Thus it may be seen that under extremely high temperatures, the thermostatic device 278, operating above a stipulated upper limit temperature, senses this extreme temperature through the shank and expands with the shaft 280 extending outwardly in direct relation to the temperature being sensed, thereby pivoting the arm 282 counterclockwise until contact 288 engages contact 290 thereby grounding the current passing through the insulated lead 224. This is similar in operation to the embodiment illustrated in FIGURE 6. Other equivalent thermostatic elements include any temperature sensor which has a movement proportional to variation in temperature and have a second rod and tube, a bulb and bellows, or a flat or spiral shaped bimetal element.

Yet another embodiment of the present invention is illustrated in FIGURE 13 which is similar to FIGURE 7. The rod 272 and tube 274 arrangement are mounted upon the shank 276 and a thermostatic device 278, similar to that illustrated in FIGURE 12, is used. In this embodiment a normally open switch 180, shown in detail in FIGURE 8, is mounted upon the shank 276 and an extremity of arm 296 is held in contact with the switch, holding closed this normally open, single pole, single throw switch. Arm 296 is fixedly attached to the shank 276 by the screw 298 and has an adjusting screw 300 positioned in spaced relation with the shaft 280 on the thermostatic device 278. Thus upon increases in temperature, the shaft will extend outwardly contacting the adjusting screw 300 and rotating the spring arm 296 counterclockwise to allow the normally open switch 180, held closed by arm 296, to open which gives an action very similar to the operation of the embodiment illustrated in FIGURE 7, described above.

Another embodiment of the present invention is illustrated in FIGURE 14 wherein a bulb 302, capillary tube 303 and bellows 304 is used as a temperature sensor for changing the position of a valve 306 within a thermostatic control 308 best used for such things as space heating apparatus. This control is illustrated and described in the patent to Jackson et al. 2,975,974 and will not be explained in full for that reason. Temperature variation sensed by the bulb 302, will change the volume of a charged fluid within the system and correspondingly expand or contract the bellows 304 mounted within the control. Expansion of the bellows 304 tends to rotate the housing 310 counterclockwise about rib 312 which allows the valve 306 to be closed by a spring 314.

An arm 315 is fixedly attached to the housing 310 and is biased by a coil spring 322 against the rear of the bellows 304 and extends downwardly and terminating in a double faced contact 316. A pair of grounding contacts 317, 318 are each mounted in the housing 310 by a pair of insulating bushings 319, 320; respectively, and are connected to a single insulated lead 224 leading to an electromagnetic device similar to that shown in FIGURE 6. In this manner, as the temperature sensed by the bulb 302 reaches an abnormally high level, the bellows 304 will expand causing contact 316 to engage contact 318 to ground out the electromagnetic device shown in FIGURE 6. In the event the bulb 302, the capillary tube 303, or the bellows 304 is punctured and the fluid therein is released, the bellows 304 would normally compress under the force of spring 322 acting against it and contact 316 would engage contact 317 which would also short-out the electromagnetic device of FIGURE 6 to shut down the device under this kind of a failure.

FIGURE 15 illustrates a control quite similar to that illustrated in FIGURE 14 and includes a similar bulb 302 and bellows 304 arrangement has one end; an arm 323 is fixedly attached to the housing 310 and another end with a pair of buttons 324, 325 mounted on opposite sides thereof. A pair of normally closed switches 180b, see FIGURE 8, are placed in spaced relation to opposite sides of the arm 323 and are connected in series by lead 326. A pair of insulating leads 220, 222, one from each of the switches 180b, are connected to an electromagnetic device as illustrated in FIGURE 7. The switches 180b are of a normally closed variety and therefore under the conditions illustrated in FIGURE 15, there would be electrical continuity between the two insulated leads 220, 222. Thus under an extremely high temperature condition, the bellows 304 would expand, until protuberance 325 engaged its switch 180b to open the same and break the continuity between the two leads 220 and 222. This opening of the circuit would cause the electromagentic device as illustrated in FIGURE 7 to disengage to shut down the entire system. This operation is very similar to the opening switch illustrated in the embodiment in FIGURE 7.

Alternatively, if the bulb 302, capillary tube 303, or bellows 304 were perforated, the fluid would escape allowing the bellows 304 to collapse under the influence of spring 322, and protuberance 324 on the arm 323 would engage its switch 180b thereby opening the circuit and causing the electromagnetic device in FIGURE 7 to open and shut down the control.

With reference to FIGURES 14 and 15, it is readily apparent that the position of the arm might be placed on any part of the bellows either directly or indirectly in contact with it, and still serve the purpose of the present invention and alternatively, the position of the contacts or the switches might be varied without departing from the scope of the present invention.

Referring now to FIGURE 16, the control device comprises a casing 330, temperature sensor 331, and operating element 332 attached thereto for operating a control device or switch 333. This control device may be used for any number of appliances which are electrically heated and require the heat to be regulated by a temperature sensor. The temperature sensor may be any known type of sensor which produces some movement with temperature variations. In this embodiment, a rod 334 is rotatably mounted within the tube 335 that is fixedly attached to an end cap. Through expansion of the tube 335 sensing changes in ambient temperature, the rod 334 having a different coefficient of expansion will axially move to operate the switch 333. An operating arm 336a extends through an opening 336 in the casing 330 and is fixedly attached to the rod 334 such that rotation of the arm will change the effective length of the rod 334 in relation to the tube 335 which thereby changes the temperature setting of the temperature sensor 331.

The rod 334 engages a button 337 which transmits motion to the thrust element 338 and clicker 339 of the snap acting mechanism that is mounted within the spider 340. Axially aligned with the rod 334 is a shaft 341 slidably mounted within the spider 340 and engageable with the switch 333 such that movement by the rod 334 will transmit motion through the thrust member 338, clicker 339, and shaft 341 such that the switch 333 may be operated.

A means for transmitting motion insensitive to the adjustment or rotation of the rod 334 includes an arm 342 which is keyed or fixedly mounted to the nut 343a which is rotated upon the threads on the rod 334. It should be recognized that the rotation of the rod 334 by the operating arm 336a will not change the relative position of the motion transmitting means. Arm 342 is pivotally mounted on bar 343 that is biased toward the left by a spring 344 acting between the nut 345 and the flange 346. Bar 347 is received within the passageway 348 in the casing 330 and has two springs 349, 350 biasing the bar downwardly. Spring 349 acts between the interior of the casing 330 and the flange 351 while a second spring 350 acts between the exterior of the casing 330 and the bottom of the reset button 352. An extension 353 on the bar 343 has a cam 354 thereon which can be used to transmit motion between bar 343 and bar 347 by the pin 355 extending laterally from the bar 347. Pin 355 and bar extension 353 are latching means mechanically reset by pushing on button 352. Release of this latching means occurs at high sensed temperatures as set by movement of bar 343 as shown. A shaft 356 is supported within a passageway 357 and is biased toward the right by the spring 358 acting upon a shaft flange 359. A pin 360 mounted upon the shaft 356 normally rides upon the upper surface of the cam 361 formed on the bar 347; upon downward movement of the bar 347, the shaft 356 will be forced to the right by spring 358 with the pin 360 riding down the cam 361, to open the switch 362 positioned adjacent and in juxtaposition to the shaft. Rotation of screw 342a will adjust the temperature at which the device will operate.

Switches 333, 362 are connected in series such that when both switches are closed, there is electrical continuity between leads 463 and 464. An insulated U-shaped contact support 465 is fixedly mounted upon casing 330 and has a pair of contacts 466, 467 mounted at its extremity. The individual switches 333, 362 are respectively mounted upon insulated supports 468, 469 mounted on casing 330. Each switch 333, 362 has a flexible blade 470, 471 and a contact 472, 473 mounted upon its extremity. Insulated wires or leads 463, 464 are connected to each switch 333, 362 which lead outwardly from the casing 330 to any desired power supply and load. This load could be an electrically operated valve such as a solenoid gas valve or the like. Thus it may be seen that the load will be supplied current only in the event that both switches 333, 362 are closed.

The operation of the control device illustrated in FIGURE 16, is as follows. Switch 333 is opened and closed by lateral movement of shaft 341 that is motivated by the operating element 332 and movement of rod 334. Thus electrical continuity between leads 463 and 464 is regulated by the movement of sensor 331. The temperature sensed by the rod and tube sensor 331 will transmit motion laterally through the shaft and open and close the first switch 333 in accordance with the temperature variations. In the event the temperature rises too rapidly or reaches a predetermined level, the switches 333, 362 would be in the position shown in FIGURE 16, and the tube 331 will be expanded pulling rod 334 and nut 343a to force the arm 342 counterclockwise against the action of its spring 344 and allowing the pin 355 on the bar 347 to ride down the cam 354 which in turn allows the pin 360 to ride down the cam 361 on the bar 347. The shaft 356 will then force the second switch 362 open and will open the circuit regardless if the first switch 333 is closed. Thus it is readily apparent that a safety mechanism will act to prevent an unsafe condition. It also should be noted that the motion transmitting means must be manually reset by depressing the reset button 352 which will force the shaft 356 to the left while the pin 360 rides up the cam 361 on the bar 347. This nonrecycling feature prevents an accidental or unintentional operation of the control after a malfunction has occurred such that the operator of the control can determine the cause for the malfunction before the control operates automatically.

Figure 17:
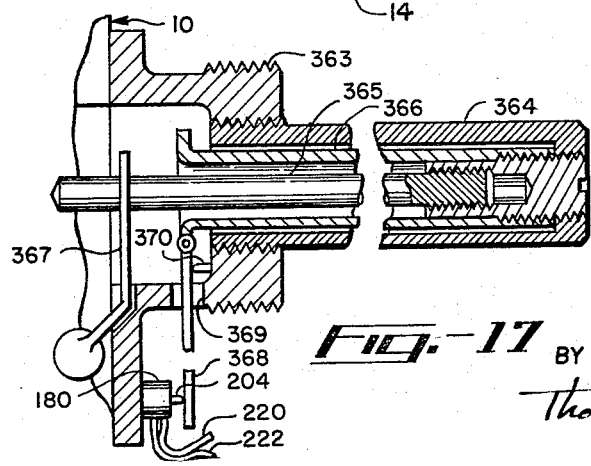
FIGURE 17 is a partial longitudinal cross-sectional partial view of another embodiment of the present invention operating an electric switch.

Referring now to FIGURE 17, another embodiment of the present invention is illustrated wherein a different temperature sensor is illustrated and may be substituted for the temperature sensor 11 illustrated in FIGURE 5. Thereby the shank 363 is fixedly mounted upon the casing 10 (similar to the manner illustrated in FIGURE 5) and a tube 364 is threadedly engaged in shank 363. Rod 365 and a second tube 366 are all attached at their extremities by a cap which is fastened to rod 365 and tubes 364 and 366. Thus it may be seen that upon changes in temperature, the second tube 366 and rod 365 can have independent axial movement at their opposite extremities. It is preferable that the rod 365 and the second tube 366 are constructed of the same material and the tube 364 is constructed of a different material and by way of example, tube 364 may be fabricated from copper and rod 365 and second tube 366 may be fabricated from Invar, thus upon thermal changes, the tube 364 will expand or contract carrying with it rod 365 and second tube 366.

An arm 367 is mounted upon the extremity of the rod 365 and upon rotation in the customary manner, the temperature setting of the sensor will be varied since the relative length of rod 365 and tube 364 will be changed with rotation of the rod 365 by arm 367.

The second tube 366 has pivotally mounted thereon, the lever 368 that extends through an opening 369 in the shank 363. Fulcrum 370 abuts the lever 368 and allows it to pivot upon axial movement of the second tube 366. The extremity of lever 368 engages the shaft 204 of the switch 180 such that upon selected movement of the second tube 366, a switch may be engaged and operate in the manner as described above with reference to FIGURES 5 and 8. Switch 180 is mounted upon the shank 363.

In operation, the embodiment in FIGURE 17 has a distinct advantage in that the adjustment of rod 365 does not change the relative position of the lever 368 with relation to switch 180 and second tube 366. Therefore, the temperature setting of the safety switch will not be affected by adjustment of the temperature sensor and the means for transmitting temperature changes insensitive to the temperature sensor adjusting means takes the form of the second tube 366.

Referring now to FIGURE 18, another embodiment of the present invention illustrated wherein another temperature sensor may be substituted for the temperature sensor illustrated in FIGURE 5. It should be noted that this temperature sensor illustrated in FIGURE 18 is used in conjunction with the remainder of the control illustrated in FIGURE 5 and the similar parts of the control art not duplicated. Shank 570 is mounted upon casing 10 and tube 571 is fixedly attached to the central portion of shank 570. Rod 572 is threadedly engaged in the cap 573 in a manner quite similar to that illustrated in FIGURE 5. In the present embodiment, an arm 574 is provided at one of the extremities of the rod 572 and upon rotation thereof will change the relative length of the rod in relation to the tube 571 and this rotation of the arm 574 adjusts the temperature being sensed by the sensor. Lever 575 is fixedly attached to the nut 576 that is threadedly engaged on the rod 572. Lever 575 abuts the fulcrum 577 such that movement of the rod 572 will cause the lever 575 to pivot and make and break the contacts within the switch 180. Thus it may be seen that rotation of the arm 574 to adjust the temperature of the temperature sensor, does not affect the relative position of the lever 575 since its position remains constant relative to stationary members such as the shank 570 or casing 10. The nut 576 and lever 575 are keyed to each other and act as a means insensitive of adjustment of the temperature sensor.

We claim:
1. A control device comprising:
 a casing having an inlet and outlet connected by a passage for fluid,
 a valve member mounted in said casing for controlling flow through said casing passage,
 a movable thermal responsive actuating means mounted in said casing for actuating said valve member,
 a thermal electric safety shutoff means for controlling fluid flow through said passage independently of said valve member,
 said safety shutoff means including an electrical conductor in proximity with said thermal responsive actuating means,
 said safety shut-off means including a thermal electric generator and an electromagnetic means energized by said thermal electric generator connected in series with said conductor,
 a normally closed switch in electrical series relation with said electrical conductor,
 a push rod in contact with said switch,
 a movable beam in abutting relation with said thermal responsive actuating means and biased against said push rod,
 a spring means interposed between said push rod and said switch to compensate for over travel of said thermal responsive actuating means,
 whereby said switch may interrupt electric energy passing through said electrical conductor to actuate said safety shut-off means in the event said valve member becomes inoperative.

2. In a thermostatic control device, the combination comprising, a casing having inlet and outlet means and flow passage means therebetween, control means in said passage means movable between controlling positions, temperature sensor means in an assembly including a rod and tube thermostat unit and mounting means therefor whereby said assembly is attached to said casing, means defining an operative connection between said control means and said rod and tube thermostat unit whereby said control means is moved between controlling positions in response to normal temperature conditons, thermoelectric means including safety shut-off means in said passage means and electromagnetic means adapted to be energized for holding said safety shutoff means in an open position, thermoelectric circuit means for energizing said electromagnetic means, and means responding to abnormal temperature conditions and being carried by said assembly so as to be in proximity to said rod and tube thermostat unit, and switch means actuated by said means responding to abnormal temperature conditions and being electrically connected in said thermoelectric circuit means for deenergizing said electromagnetic means in response to abnormal temperature conditions.

3. The combination as recited in claim 2 wherein said switch means comprises a normally closed switch electrically connected in series in said thermoelectric circuit means.

4. The combination as recited in claim 3 wherein said means responding to abnormal temperature conditions comprises a lever extension disposed between said switch and said operative connection, and means transmitting excessive movement of said rod and tube thermostat unit when sensing abnormal temperature conditions to said lever extension to cause opening of said switch.

5. The combination as recited in claim 3 wherein said means responding to abnormal temperature conditions comprises a spring arm having one end fixed to said mounting means and another end disposed to actuate said switch, and having an intermediate portion operatively connected to an end portion of the rod of said rod and tube thermostat unit whereby excessive movement thereof when sensing abnormal temperature conditions causes opening of said switch.

6. The combination as recited in claim 3 wherein said means responding to abnormal temperature conditions comprises a spring arm having one end fixed to said mounting means and another end disposed to actuate said switch, and expanding and contracting means carried by said assembly in spaced relation to said rod and tube thermostat unit, said expanding and contracting means engaging said spring arm and moving the same when sensing abnormal temperature conditions to cause opening of said switch.

7. The combination as recited in claim 3 wherein said means responding to abnormal temperature conditions comprises a resettable latch means for actuating said switch, an arm carried by an end portion of the rod and said rod and tube thermostat unit, a bar having one end carried by said arm for movement thereby and an opposite end operatively connected to said resettable latch means whereby excessive movement of said rod and tube thermostat unit when sensing abnormal temperature conditions is transmitted to said resettable latch means for opening said switch.

8. The combination as recited in claim 3 wherein said means responding to abnormal temperature conditions comprises an arm carried by an end portion of the rod of said rod and tube thermostat unit, said arm having a portion engaging said switch whereby excessive movement of said rod and tube thermostat unit when sensing abnormal temperature conditions causes opening of said switch.

9. The combination as recited in claim 2 wherein said switch means comprises a normally open switch defining a grounding circuit between said thermoelectric circuit means and said electromagnetic means.

10. The combination as recited in claim 9 wherein said means responding to abnormal temperature conditions comprises a spring arm having one end fixed to said mounting means and another end defining a switch actuator, and having an intermediate portion operatively connected to an end portion of the rod of said rod and tube thermostat unit whereby excessive movement thereof when sensing abnormal temperature conditions causes closure of said switch.

11. The combination as recited in claim 9 wherein said means responding to abnormal temperature conditions comprises a lever extension disposed between said switch and said operative connection, and means transmitting excessive movement of said rod and tube thermostat unit when sensing abnormal temperature conditions to said lever extension to cause closing of said switch.

12. The combination as recited in claim 9 wherein said means responding to abnormal temperature conditions comprises a spring arm having one end fixed to said mounting means and another end disposed to actuate said switch, and expanding and contracting means carried by said assembly in spaced relation to said rod and tube thermostat unit, said expanding and contracting means engaging said spring arm and moving the same when sensing abnormal temperature conditions to cause closing of said switch.

13. A control device comprising a casing having control means movable between controlling positions, operating means for moving said control means, normal temperature responsive means actuating said operating means between controlling positions corresponding to first and second temperature conditions, said normal temperature responsive means including a rod and tube made of different thermal responding materials to define a thermostat unit, mounting means for mounting said thermostat unit to said casing, thermoelectric means including safety control means in said casing and electromagnetic means adapted to be energized for holding said safety control means in an open position, thermoelectric circuit means for energizing said electromagnetic means, means disposed between the rod and tube of said thermostat unit and being made of material different from the tube of said thermostat unit, lever means actuated by said means disposed between the rod and tube, switch means actuated by said lever means and being electrically connected in said thermoelectric circuit means for deenergizing said electromagnetic means in response to abnormal temperature conditions, and said means disposed between the rod and tube comprising a tube of INVAR material having one end connected to said rod and tube thermostat unit and an opposite end for actuating said lever means and said switch means.

References Cited by the Examiner

UNITED STATES PATENTS

| | | | |
|---|---|---|---|
| 2,276,909 | 3/1942 | Alfery. | |
| 2,303,701 | 12/1942 | Mantz | 236—21 |
| 2,303,702 | 12/1942 | Mantz | 236—21 |
| 2,312,479 | 3/1943 | Ray | 236—21 |
| 2,354,755 | 8/1944 | Johnson | 236—1 |
| 2,383,401 | 8/1945 | Mantz | 236—21 |
| 2,773,649 | 12/1956 | Hilgert | 236—21 |
| 2,781,977 | 2/1957 | Stanley | 236—21 |
| 2,879,358 | 3/1959 | Hilgert | 236—21 X |
| 2,986,720 | 5/1961 | Chess | 339—89 |
| 3,076,169 | 1/1963 | Blaisdell | 339—89 |

EDWARD J. MICHAEL, *Primary Examiner.*